(12) United States Patent
Zayats et al.

(10) Patent No.: US 10,897,402 B2
(45) Date of Patent: Jan. 19, 2021

(54) STATISTICS INCREMENT FOR MULTIPLE PUBLISHERS

(71) Applicant: HEWLETT PACKARD ENTERPRISE DEVELOPMENT LP, Houston, TX (US)

(72) Inventors: Michael Zayats, Santa Clara, CA (US); Aslam Khan, Santa Clara, CA (US); Noorinbano Shaikh, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 26 days.

(21) Appl. No.: 16/242,123

(22) Filed: Jan. 8, 2019

(65) Prior Publication Data
US 2020/0220786 A1     Jul. 9, 2020

(51) Int. Cl.
*H04L 12/24*     (2006.01)
*G06F 16/23*     (2019.01)

(52) U.S. Cl.
CPC ........ *H04L 41/142* (2013.01); *G06F 16/2379* (2019.01); *H04L 41/042* (2013.01); *H04L 41/046* (2013.01); *H04L 41/5035* (2013.01); *H04L 41/5038* (2013.01)

(58) Field of Classification Search
CPC . H04L 41/00–50; H04L 41/5032–5038; H04L 43/00–50; G06F 16/2379
See application file for complete search history.

(56) References Cited

U.S. PATENT DOCUMENTS

| 5,555,388 | A |   | 9/1996 | Shaughnessy |
| 5,860,070 | A | * | 1/1999 | Tow ..................... G06F 16/284 707/704 |
| 6,046,988 | A | * | 4/2000 | Schenkel ................ H04L 41/12 370/235 |
| 6,058,102 | A | * | 5/2000 | Drysdale .................. H04L 1/24 370/248 |
| 6,279,037 | B1 | * | 8/2001 | Tams ..................... H04L 43/12 709/223 |

(Continued)

OTHER PUBLICATIONS

Yegulalp, S., NoSQL Standouts: the Best Key-value Databases, (Web Page), Sep. 13, 2017, 2 Pgs.

*Primary Examiner* — David R Lazaro
*Assistant Examiner* — Julian Chang
(74) *Attorney, Agent, or Firm* — Nolte Intellectual Property Law Group

(57) ABSTRACT

A central database maintains values for client publishing devices or application processes executing locally with a database server process or remotely on a different device. Updates may be made by receiving, from a publishing application, an update to a statistic value in a database. The update may include: an indication to process the update as an accumulation update to the statistic value, an accumulation value to apply, and an indication of a key value pair to identify the statistic value to update. Upon receipt, a database server process may obtain access control as appropriate, obtain a current value for the update, apply the accumulation value to the current value, and store the result value as the new statistic value. Updates may be made by client publishers without client publishers being aware of a current value of the statistic. The statistic may represent a network wide operational parameter.

15 Claims, 11 Drawing Sheets

(56) References Cited

U.S. PATENT DOCUMENTS

| | | | |
|---|---|---|---|
| 6,411,997 B1* | 6/2002 | Dawes | H04L 41/12 709/224 |
| 6,678,250 B1* | 1/2004 | Grabelsky | H04L 43/06 370/241 |
| 6,885,632 B1* | 4/2005 | Mattson | H04J 3/14 370/216 |
| 6,956,854 B2 | 10/2005 | Ganesh et al. | |
| 7,676,576 B1* | 3/2010 | Kommula | G06F 1/3209 709/223 |
| 8,117,356 B1* | 2/2012 | Narad | H04L 43/0888 709/223 |
| 8,479,057 B2* | 7/2013 | Poletto | H04L 41/0893 709/224 |
| 8,510,807 B1* | 8/2013 | Elazary | G06F 9/541 726/4 |
| 8,745,014 B2 | 6/2014 | Travis | |
| 9,253,021 B2* | 2/2016 | Vasseur | H04L 41/044 |
| 9,948,496 B1* | 4/2018 | Hughes | H04L 43/08 |
| 10,009,246 B1* | 6/2018 | Benattar | H04L 43/0876 |
| 10,044,522 B1* | 8/2018 | Shamis | H04L 41/0816 |
| 10,176,069 B2* | 1/2019 | Borah | G06F 11/3409 |
| 10,178,016 B1* | 1/2019 | Hall | H04L 43/50 |
| 10,368,284 B2* | 7/2019 | Lau | H04W 88/12 |
| 10,560,372 B1* | 2/2020 | Lucas | H04L 67/327 |
| 10,606,856 B2* | 3/2020 | Bath | G06F 16/9535 |
| 10,606,857 B2* | 3/2020 | Haggie | G06F 16/8373 |
| 10,608,992 B2* | 3/2020 | Jain | G06F 21/552 |
| 2002/0198984 A1* | 12/2002 | Goldstein | H04L 67/22 709/224 |
| 2002/0198985 A1* | 12/2002 | Fraenkel | H04L 41/5009 709/224 |
| 2003/0065986 A1* | 4/2003 | Fraenkel | G06F 11/3089 714/47.2 |
| 2004/0098478 A1* | 5/2004 | Koetke | H04L 51/34 709/224 |
| 2005/0114536 A1* | 5/2005 | Narad | H04L 43/0888 709/231 |
| 2006/0050647 A1* | 3/2006 | Dugan | H04L 49/357 370/252 |
| 2006/0064408 A1* | 3/2006 | Enbutsu | G06F 16/2343 |
| 2007/0204060 A1* | 8/2007 | Higuchi | H04L 43/16 709/234 |
| 2007/0265894 A1* | 11/2007 | Van de Voort | H04L 41/0663 705/7.12 |
| 2008/0267202 A1* | 10/2008 | Lin | H04L 65/103 370/401 |
| 2009/0049152 A1* | 2/2009 | Rimhagen | H04W 24/08 709/209 |
| 2009/0086651 A1* | 4/2009 | Luft | H04L 41/5067 370/253 |
| 2010/0097944 A1* | 4/2010 | Wang | H04L 41/5009 370/250 |
| 2010/0274893 A1* | 10/2010 | Abdelal | H04L 47/18 709/224 |
| 2012/0110055 A1* | 5/2012 | Van Biljon | G06Q 30/04 709/201 |
| 2012/0198050 A1* | 8/2012 | Maki | H04L 43/04 709/224 |
| 2013/0031412 A1* | 1/2013 | Iwasaki | H04L 43/50 714/32 |
| 2013/0258847 A1* | 10/2013 | Zhang | H04L 47/41 370/232 |
| 2013/0325827 A1* | 12/2013 | Markus | G06F 16/23 707/703 |
| 2013/0347103 A1* | 12/2013 | Veteikis | H04L 43/04 726/22 |
| 2014/0032741 A1* | 1/2014 | Lau | H04L 67/22 709/224 |
| 2014/0040208 A1* | 2/2014 | Graefe | G06F 16/2343 707/648 |
| 2014/0189536 A1* | 7/2014 | Lange | H04L 67/22 715/753 |
| 2015/0117226 A1* | 4/2015 | Kim | H04M 15/58 370/241 |
| 2015/0139250 A1* | 5/2015 | Fung | H04L 41/142 370/503 |
| 2016/0094419 A1* | 3/2016 | Peacock | H04L 43/12 709/213 |
| 2016/0234087 A1* | 8/2016 | Nyerges | H04Q 9/00 |
| 2016/0306810 A1* | 10/2016 | Ni | G06F 16/122 |
| 2016/0371318 A1* | 12/2016 | Hillel | G06F 16/2365 |
| 2017/0048253 A1* | 2/2017 | Anton | H04L 63/10 |
| 2017/0170956 A1* | 6/2017 | Cipu | H04L 9/0841 |
| 2017/0250953 A1* | 8/2017 | Jain | H04L 63/1458 |
| 2017/0272209 A1* | 9/2017 | Yanovsky | G06F 12/0253 |
| 2017/0317874 A1* | 11/2017 | Borah | H04L 12/42 |
| 2018/0046918 A1* | 2/2018 | Moon | G06F 9/44552 |
| 2018/0083791 A1* | 3/2018 | Shanbhag | H04L 12/1886 |
| 2018/0089188 A1* | 3/2018 | Kharisma | G06F 16/2228 |
| 2018/0123929 A1* | 5/2018 | Viens | H04L 43/022 |
| 2018/0165348 A1* | 6/2018 | Cole | G06F 16/283 |
| 2018/0173372 A1* | 6/2018 | Greenspan | G06F 16/2465 |
| 2018/0262454 A1* | 9/2018 | Zandi | H04L 41/142 |
| 2018/0262585 A1* | 9/2018 | Zandi | H04L 45/02 |
| 2018/0262592 A1* | 9/2018 | Zandi | H04L 67/26 |
| 2019/0028435 A1* | 1/2019 | Khare | G06F 9/45558 |
| 2019/0095478 A1* | 3/2019 | Tankersley | G06F 11/3006 |
| 2019/0116504 A1* | 4/2019 | Rusackas | H04L 41/14 |
| 2019/0129767 A1* | 5/2019 | Wu | G06F 9/547 |
| 2019/0132190 A1* | 5/2019 | Jeyakumar | G06N 20/00 |
| 2019/0149440 A1* | 5/2019 | Rantzau | H04L 43/062 370/241 |
| 2019/0236149 A1* | 8/2019 | Kuruvada | G06Q 10/063 |
| 2019/0268725 A1* | 8/2019 | Edge | H04W 4/02 |
| 2019/0281373 A1* | 9/2019 | Sadasivarao | H04Q 11/0067 |
| 2020/0014688 A1* | 1/2020 | Kohli | H04L 9/0891 |
| 2020/0014713 A1* | 1/2020 | Paul | H04L 63/1416 |
| 2020/0092138 A1* | 3/2020 | Tillotson | G06F 9/45558 |
| 2020/0092193 A1* | 3/2020 | Tillotson | H04L 61/256 |
| 2020/0092194 A1* | 3/2020 | Tillotson | H04L 45/306 |
| 2020/0092201 A1* | 3/2020 | Tillotson | H04L 49/354 |
| 2020/0092252 A1* | 3/2020 | Tillotson | G06F 9/45558 |

* cited by examiner

STATISTICS INCREMENT FOR MULTIPLE PUBLISHERS

BACKGROUND

Networks of computers that support business activities are often composed of a multitude of infrastructure devices. These infrastructure devices may provide, for example, a method of combining several physically different networking technologies to appear virtually as one cohesive network. The infrastructure devices may also provide methods of controlling the flow of data to ensure the network operates securely and efficiently. Data flow between network-aware applications and services may be "invisibly" facilitated, in part, by these network infrastructure devices. Examples of network infrastructure devices may include, but are not limited to, load-balancers, routers, switches, and firewalls. These infrastructure devices may be referred to in this disclosure as simply "network infrastructure devices" and are often critical to network operations.

Network infrastructure devices that support critical network operations may have (or be communicatively coupled to) a central database to store configuration and operational statistics for a plurality of network communication devices. The operational statistics allow personnel that are maintaining the network infrastructure to understand if a device is functioning properly, if the device is under- or over-utilized, or any number of other indicators that could affect the stability of the network supported by the network communication device. The centralized database that stores the configuration and operational statistics may be referred to as the "central database" in this disclosure.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not perform serial processing and therefore those functions may be performed in an order different than shown or possibly in parallel with each other. For a detailed description of various examples, reference will now be made to the accompanying drawings, in which.

DETAILED DESCRIPTION

Figure 1A:
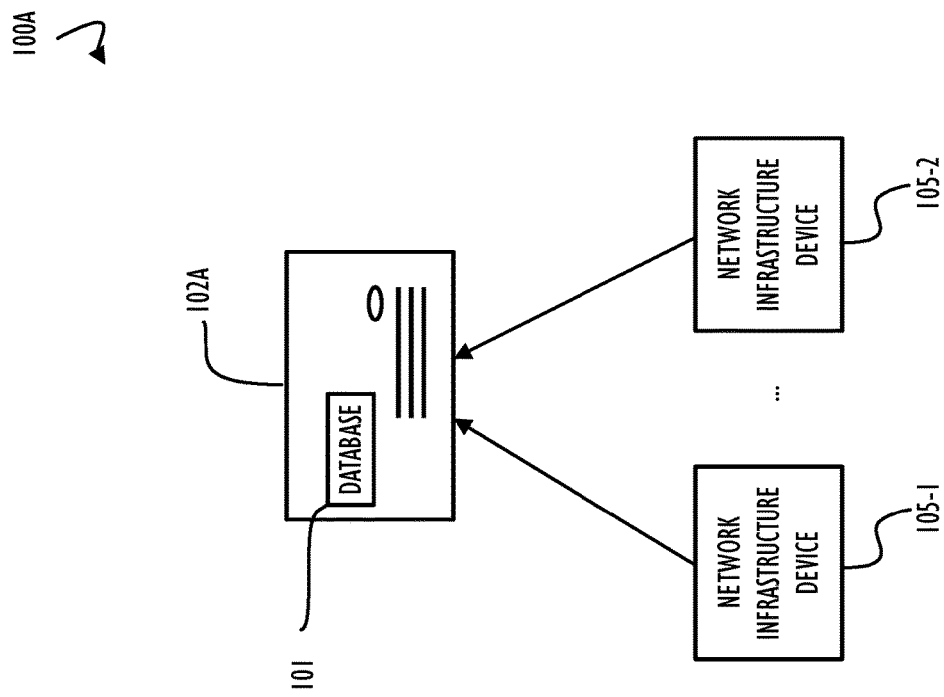
FIG. 1A illustrates a functional block diagram including multiple network infrastructure devices accessing a central database, according to one or more disclosed implementations.

Illustrative examples of the subject matter claimed below will now be disclosed. In the interest of clarity, not all features of an actual implementation are described for every example implementation in this disclosure. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Network infrastructure devices may collect operational statistics related to the function of the network device. These statistics are often used by personnel that are managing the network to monitor the devices to ensure they are functioning properly, assess if the device is under- or over-utilized, or observe any number of other indicators that could affect the stability of the network supported by the network communication device. Some statistics (e.g., operational metrics) may reflect processing of a single device or may be reflective of performance of the network as a whole. In some cases, metrics may be absolute values that change over time to reflect current statistics (e.g., number of currently connected devices) or may be accumulative over a period of time (e.g., packets processed in a time period, dropped packets, total packets processed since restart, etc.). Often, a single network may utilize a plurality of network infrastructure devices concurrently. Each of these different devices may asynchronously report their statistics. Accordingly, coordination may be desired when recording these operational statistics in a centralized location, such as a central database. A central database may be desirable, in part, because it may ease the ability to retrieve and view statistics for all network infrastructure devices in a comprehensive manner. Organizing data where one copy of the data is centrally shared across multiple devices may include techniques to control the consistency of the data both for reading and writing. The above-mentioned coordination may take into account access controls to ensure that different devices (e.g., publisher/updaters of statistic values) from providing information that over-writes information from other devices in the same network (and communicating with the same central database).

In addition to storing operational metrics, configurations of network infrastructure devices may also be stored in a central database to assist in managing configurations for large numbers of network infrastructure devices. Thus, the central database may store both operational statistics that may change frequently and configuration parameters that may change less frequently. The central database may store this type of information and other network related information and a network may consist of a large number of devices of different architectures (hardware and operating system) and capabilities. Further, these multiple devices may be interacting with the central database to concurrently update statistics. These devices may be considered "publishers" of database update information. Support should be provided to allow multiple publishers efficient and context aware updates to different entries in the central database based on different attributes of collected statistics.

Network infrastructure devices may update their operational statistics with varying frequency. A router on a busy network, for example, may update statistics related to the number of data packets routed between two connections more frequently than a router on a network that is not as busy (e.g., may be based on a volume or crossing a threshold of a metric). The frequency may also depend on the statistic being collected. A firewall, for example, may report blocked connection attempt statistics only when it encounters blocked connections (e.g., may be event driven update based on an unexpected event). The frequency with which blocked connections occur may depend on a usage pattern of the network at any given point in time. While firewalls are generally in place to prevent and block unauthenticated connections, a firewall blocking a connection may still be considered an "unexpected" event because it does not result from normal usage of a network. Similarly, threshold crossings (e.g., crossing of limits set by system administrators for monitoring) may also be considered unexpected events because these operational limits may have been set such that they are only crossed when a network is not operating as expected. It may also be desirable for a central database to control consistency of the recorded operational statistics when multiple network infrastructure devices attempt to perform asynchronous updates to commonly shared metrics (stored as database entries) at random reporting (e.g., publishing) intervals.

Disclosed techniques represent an improvement to the art of network administration, in part, by allowing multiple publishers to asynchronously (and possibly simultaneously) supply operational statistics to a central database. In some cases, updates may be processed differently based on the type of metric. In one example, only accumulation values for a statistics value may be published (possibly without knowledge or concern of the current value). This "change amount" may be referred to as a "delta value" to describe the amount a statistic value has changed between two points in time (e.g., since a last successful publishing event) from the perspective of the publishing device (e.g., without knowledge or care about activities of other devices). For example, at 1:00 PM a router may have recorded a statistic that 1,000 data packets had been routed between two ports on the router. At 2:00 PM, the router may have a total count of 1,500 packets having been routed between two ports. The delta value of the statistic counting the data packet routed between two ports is therefore 500 at 2:00 PM. Accordingly, this router, representative of a single device among many, may publish a value of 500 to the central database server for its 2:00 PM update. Alternatively, if an accounting of the original 1,000 data packets is in error (e.g., no successful acknowledgement of previous publishing event), then the 2:00 PM reporting value may include the original 1,000 packets and the 2:00 PM update may publish a value of 1,500 to the central database server (e.g., to account for the missed update).

As an example of how the above-mentioned access controls may be implemented at a central database server, consider that two processes simultaneously attempt to update the central database. In this example, Process A may attempt to provide an update to the central database at the same time as Process B may be attempting to read data from the central database. The order of the arrival and execution of requests is non-deterministic as is the amount of time that is taken to execute each request. The request to write from Process A may get executed first and therefore the request from Process B may be forced to wait until Process A's write is complete. Process B may also be forced to wait to ensure it does not retrieve data that was only partially written by Process A. In some cases, in accordance with the example, a single process implementing a write may take a relatively long time with respect to performance criteria. This specific example uses only two processes for simplicity in explanation. In a real-world scenario, there may be multiple processes simultaneously making requests (read or write) while a request from another process is currently executing. As each subsequent waiting request is selected for execution, the other waiting requests may wait for the currently executing request (and possibly a number of previously queued requests) to complete. The amount of time a request waits may therefore be the sum of several previously submitted requests that may have arrived nearly simultaneously. This type of access may lead to unpredictable response times for different client devices or client processes attempting to access a centrally controlled repository (e.g., the central database).

The techniques of this disclosure may improve efficiency, reliability, and coordination of updates in general with respect to maintaining system wide operational statistics, in part, by having clients configured as publisher/updaters to a database process, and in some cases, submit an amount by which a statistic changes. This "change amount" is sometimes referred to as a "delta value" or an "accumulator increment," and may be provided as an amount to reflect a change in a statistic value between two points in time (or two successful updates in some implementations). For example, at 1:00 PM a router may have recorded a statistic that 1,000 data packets had been routed between two ports on the router. At 2:00 PM, the router may have a total count of 1,500 packets having been routed between two ports. The delta value of the statistic counting the data packet routed between two ports may be submitted as 500 when the value of 1,000 at 1:00 PM is subtracted from the current value of 1,500 for the 2:00 PM update.

Network infrastructure devices, as clients of the central database, previously may have had to first read the currently recorded value for a statistic, adjust the value, and write a new value to the central database. Clients of the central database, utilizing techniques of this disclosure, may provide the statistic name and accumulator increment value to allow a database server process to update to the central database. In some implementations, delta values may also be recorded in the database rather than updating a single stored value of the statistic at the time the delta value is written. This technique may reduce some of the complex implementation coordination for ensuring data accuracy when multiple clients are concurrently attempting to update the same data value. Further, storing delta values in the database may reduce overhead of enforcing data consistency when multiple client operations take place concurrently.

Having an understanding of the above overview, this disclosure now explains one possible non-limiting example implementation (and possible variants thereof). This example implementation is explained with reference to the figures that include: a functional block diagram showing multiple network infrastructure devices accessing a central database and a functional block diagram of an example network infrastructure device (e.g., switch/router) (FIGS. 1A-B); a functional block diagram illustrating multiple network infrastructure devices accessing a central database to submit operational statistics and an alternate implementation where a multi-client configuration uses a central database (FIGS. 2A-B); a flow chart illustrating a network infrastructure device recording and reporting operational statistics to a central database (FIG. 3); an example processor and computer-readable medium used to implement a network infrastructure device recording and reporting operational statistics to a central database (FIG. 4); a flow chart illustrating interaction with a central database for receiving and recording updates to operational statistics (FIG. 5A); a block diagram of multiple publisher updaters providing asynchronous updates to a central data base server process (FIG. 5B); an example processor and computer-readable medium to implement interaction with a central database receiving and recording updates to operational statistics (FIG. 6); a computer network infrastructure that may be used to implement all or part of the disclosed-technique for a central database receiving and recording updates to operational statistics (FIG. 7); and an example processing device that may be used in one or more devices that may implement the disclosed techniques for a central database receiving and recording updates to operational statistics (FIG. 8).

Referring to FIG. 1A, an example block diagram 100A illustrates a central database 101 containing configuration data and operational statistics for one or more network infrastructure devices 105-1 and 105-2. As illustrated, central database 101 may be stored on a device 102A accessible to a plurality of remote devices (e.g., network infrastructure devices 105-1 and 105-2). Device 102A may be a network infrastructure device or may simply be a computer device configured to provide a database service (not shown but executing on device 102A). Devices that may be considered a network infrastructure device may include load-balancers, routers, switches, firewalls, or other network connected devices that may provide services for controlling data flow across a network. Some network infrastructure devices may provide a combination of functions provided by other network infrastructure devices. In FIG. 1A, block diagram 100A illustrates a plurality of network infrastructure devices 105 that coordinate updates via central database 101. Block diagram 100A represents a depiction of a single central database 101 and is not intended to limit all implementations of the central configuration database to a single instance of the database. Techniques may be employed to create a central database that has no single point of failure to prevent network failure in the event of a device hosting the central database fails. These techniques are understood with respect to making a critical resource highly available. Any high availability techniques may be used in conjunction with disclosed implementations, but for simplicity, may not be specifically discussed when explaining the examples in this disclosure. Additionally, many hybrid configurations with respect to a central database versus a local database implementation are possible. Specifically, some network infrastructure devices (e.g., 105-1 and 105-2, or other devices discussed herein) may have a local database and also be in communication with a central database. That is, network infrastructure devices may store some values (e.g., configuration data and operational statistics) locally and/or provide them to a central database such as central database 101 that, in this example, is located on a different device than the network infrastructure device.

Figure 1B:
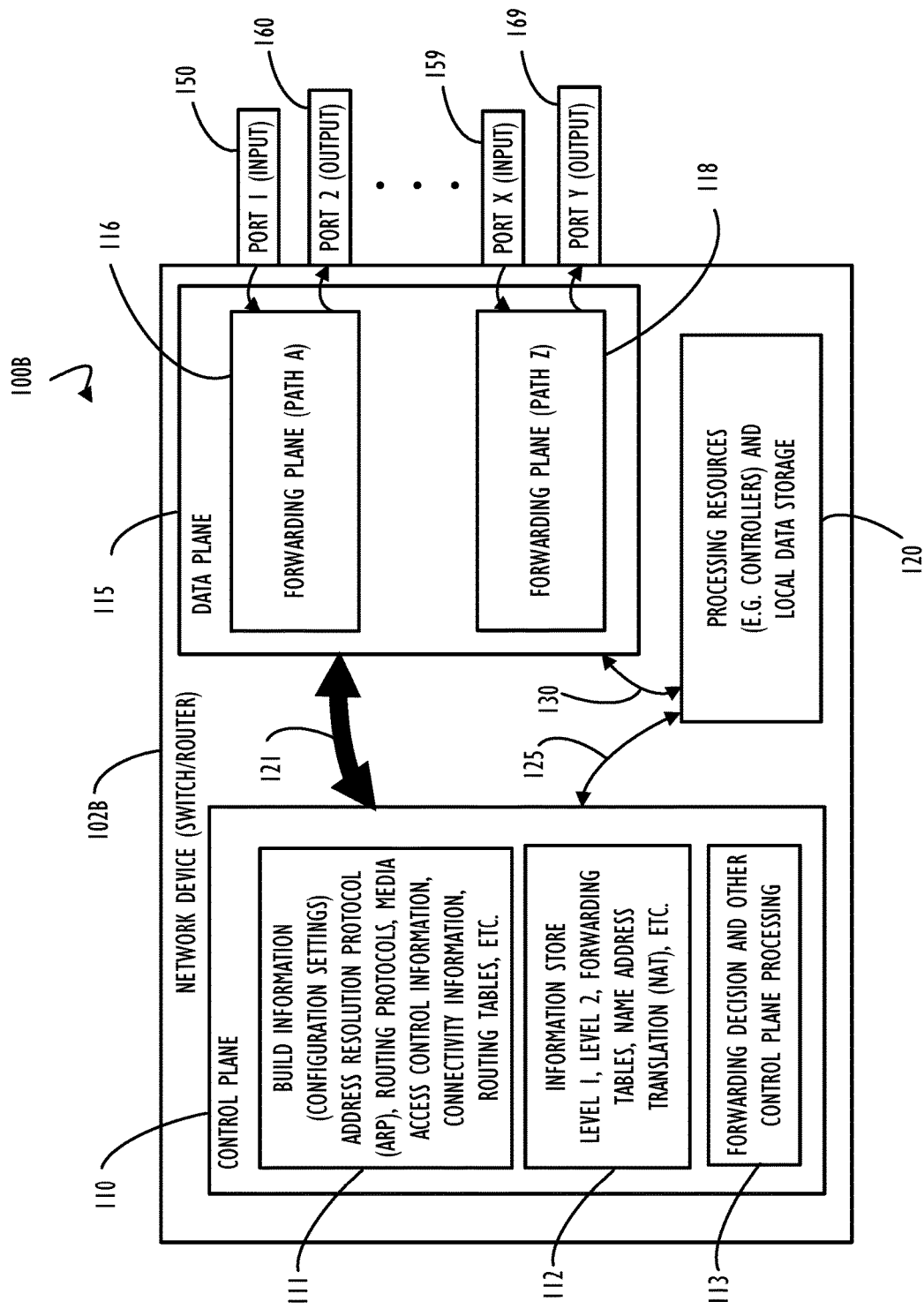
FIG. 1B illustrates a block diagram representing functional modules and functional components of a switch/router as an example of a network infrastructure device, according to one or more disclosed implementations.

Referring now to FIG. 1B, a network infrastructure device such as a switch/router 102B is illustrated as an example in block diagram 100B. In general, a router has at least two types of network element components organized onto separate planes illustrated as control plane 110 and data plane 115. In addition, a typical switch/router 102B may include processing resources and local data storage 120. Depending on the capabilities of a particular switch/router 102B different types of processing resources and local storage may be present. In general, implementations including higher capacity router/switch 102B may include substantial processing resources and memory while simpler (e.g., low capacity) devices may contain less internal resources.

Control plane 110, for example in a router, may be used to maintain routing tables (or a single comprehensive routing table) that list which route should be used to forward a data packet, and through which physical interface connection (e.g., output ports 160 through 169). Control plane 110 may perform this function by using internal preconfigured directives, called static routes, or by learning routes dynamically using a routing protocol. Static and dynamic routes may be stored in one or more of the routing tables. The control-plane logic may then strip non-essential directives from the table and build a forwarding information base (FIB) to be used by data plane 115. Although ports in this example are illustrated as input or output, in practice ports are generally used for both input and output.

A router may also use a forwarding plane 116 (e.g., part of the data plane 115) that contains different forwarding paths for information from different ports or different destination addresses (e.g., forwarding path A shown in forwarding plane 116 or forwarding path Z shown in forwarding plane 118). In general, The router forwards data packets between incoming (e.g., ports 150-159) and outgoing interface connections (e.g., ports 160-169). The router forwards data packets to the correct network type using information that the packet header contains matched to entries in the FIB supplied by control plane 110. Ports are typically bidirectional and are shown in this example as either "input" or "output" to illustrate flow of a message through a routing path. In some network implementations, a router (e.g., network infrastructure device switch/router 102B) may have interfaces for different types of physical layer connections, such as copper cables, fiber optic, or wireless transmission. A single router may also support different network layer transmission standards. Each network interface may be used to enable data packets to be forwarded from one transmission system to another. Routers may also be used to connect two or more logical groups of computer devices known as subnets, each with a different network prefix.

Also illustrated in FIG. 1B, bidirectional arrow 121 indicates that control plane 110 and data plane 115 may work in a coordinated fashion to achieve the overall capabilities of network infrastructure device switch/router 102B. Similarly, bidirectional arrow 125 indicates that processing and local data storage resources 120 may interface with control plane 110 to provide processing and storage support for capabilities assigned to control plane 110. Bidirectional arrow 130 indicates that processing and local data storage resources 120 may also interface with data plane 115 as necessary. During processing, each of these components may collect statistic values representative of the local device or the network as a whole and may be provided to a central database as described herein.

Control plane 110, as illustrated in FIG. 1B, includes several example functional control blocks. Additional control blocks are possible depending on the capabilities of a particular implementation of a network device. Block 111 indicates that control plane 110 may have associated build information regarding a software version of control code that is currently executing on infrastructure network device switch/router 102B. In addition, that software version may include configuration settings to determine how network infrastructure device switch/router 102B and its associated control code perform different functions.

As illustrated in FIG. 1B, block 111 indicates that routing information and connectivity information may be known to network device 102B and may be made available to control plane 110 or data plane 115 (e.g., via path 121 or as part of processing via paths 125 and 130). Block 112 similarly indicates that an information store may be accessible from control plane 110 and include forwarding tables or NAT information as appropriate. Block 113 indicates that control plan 110 may also be aware of forwarding decisions and other processing information. Although FIG. 1B illustrates these logical capabilities within control plane 110, they may actually be implemented outside of, but accessible to, control plane 110.

Many different configuration settings for both the software and the device itself are possible. Each device may also have an associated set of operational statistics that are collected based on the configuration or purpose of the device. An example router 102B illustrated in FIG. 1B may collect statistics such as the number of network packets that may have been received at each input port 150-159. Another network infrastructure device may collect statistics that are similar to those collected by a router but with additional statistics collected based on the purpose of the individual device. A firewall, for example, may collect statistics on the number of network packets received on an input port in addition to statistics about the number of packets blocked due to firewall rules restricting the transmission of packets. The number of configuration options and operational statistics is unlimited and describing each is beyond the scope of this disclosure. However, it is recognized that some of these operational statistics may be maintained as accumulation increments rather than absolute values.

Figure 2A:
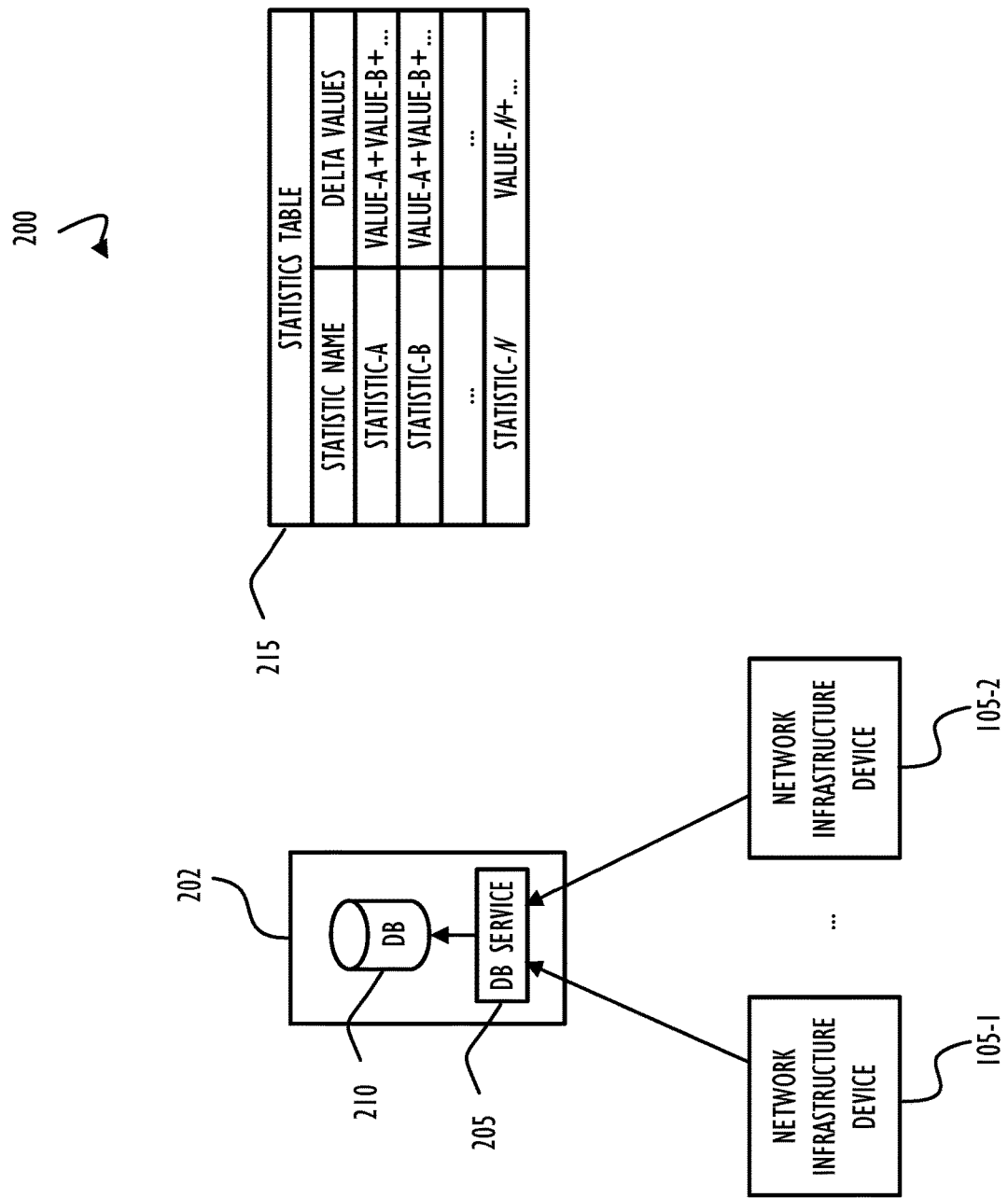
FIG. 2A illustrates a functional block diagram including multiple network infrastructure devices communicating with a central database (where the database is maintained at a central location for multiple other devices) to maintain operational statistics.

Referring now to FIG. 2A, an example of a plurality of network infrastructure devices (two shown 105-1 and 105-2) utilizing a central database system 202 (including storage and processing) is illustrated in block diagram 200. This example depicts a centralized database system 202 including a primary data access service 205 that may mediate access to a data store (e.g., DB 210) and a plurality of network infrastructure devices 105-1, 105-2 as clients. The primary database access service 205 may mediate commands from network infrastructure devices 110 such as reading from the database, writing to the database, or adding a delta value list of delta values stored in the database. This example is intended to merely illustrate some of the operations the primary database service 205 may provide, additional services are also possible without deviating from the scope of this disclosure. In general, database system 202 may represent an example of a central database that includes a database server process (e.g., DB service 205) and a data store (illustrated as DB 210).

In this example, primary database service 205 may respond to requests made by network infrastructure devices 105-1, 105-2 with data indicating that write requests were successful, data resulting from read requests, or other information related to any command supported by the database service 205 to change or retrieve data from data store DB 210. These types of interactions with the database service 205 only serve as an example of types of responses or interactions that could be performed with clients of configuration database system 202 as representative of a central database.

Table 215 illustrates one non-limiting example of the delta values that may be stored (e.g., temporarily stored while processing) for statistics when a network infrastructure device 105-1 or 105-2 publishes an update (e.g., sends an update command) to the database service 205 (e.g., to add an accumulation value for a statistic). One or more tables (or portions of a table) may be used as a "statistics table" to store accumulation values associated with a statistic name. In this example, each row of the table is represented a list of delta values paired with an associated statistic name. The table may contain zero or more statistics, each statistic name may be variable and defined, for example, when the network infrastructure device is developed.

Figure 2B:
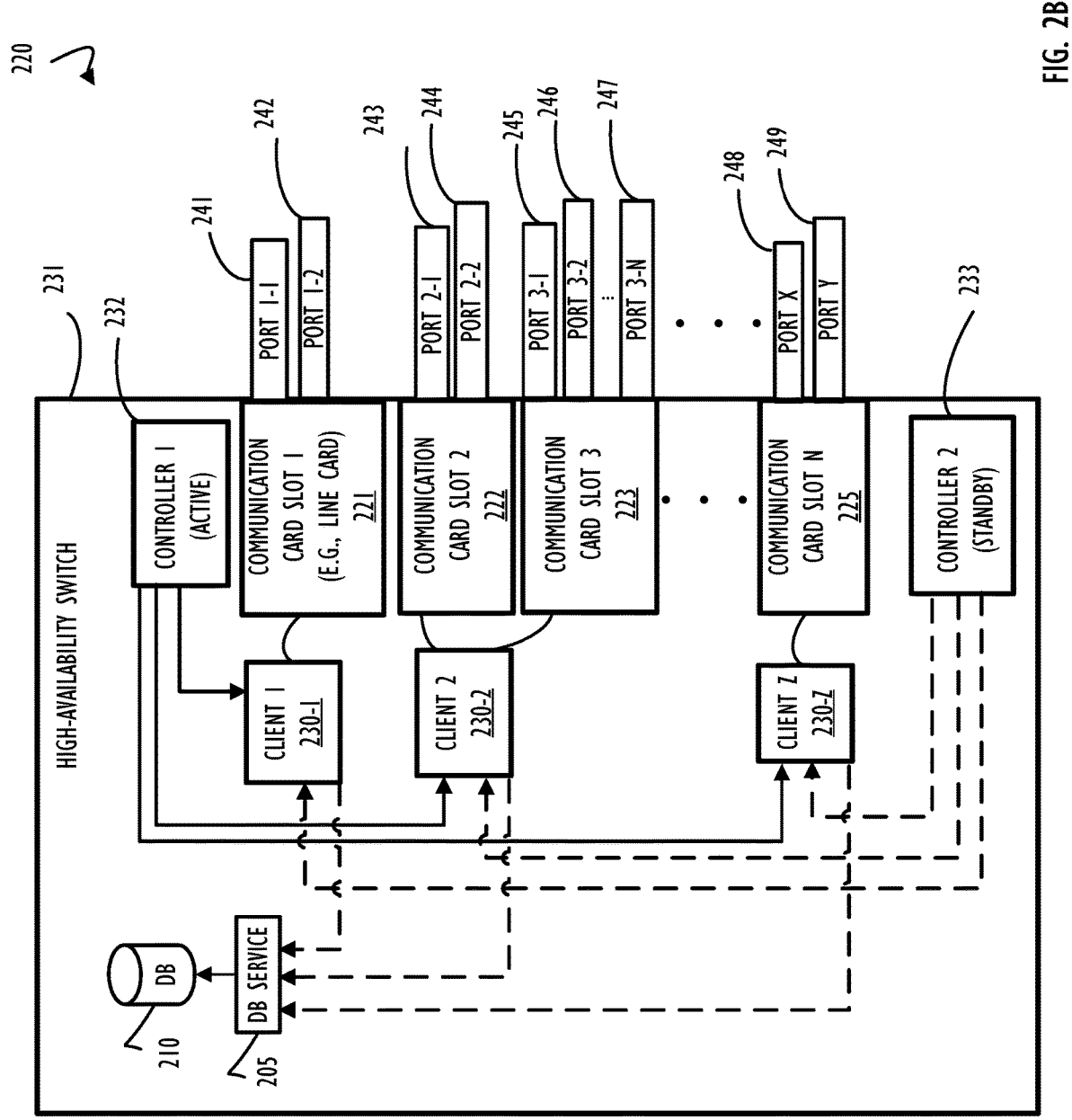
FIG. 2B illustrates a function block diagram including multiple client applications, executing locally on a single network infrastructure device, accessing a central database (where the database is central for multiple client applications of a device), according to one or more disclosed implementations.

Referring now to FIG. 2B, an example of a high-availability switch 231 is illustrated in block diagram 220. High-availability switch 231 is illustrated with two controllers. Controller 1 (232) is identified as the "active" controller and Controller 2 (233) is identified as the "standby" controller. As explained in more detail below, a high-availability switch, such as high-availability switch 231, may have any number of controllers and typically has at least two. In some configurations, the controllers work as a primary/backup pair with a dedicated active controller and a dedicated standby controller. In a primary/backup configuration, the primary performs all network functions and the standby, as its name suggests, waits to become the active if a failover condition is reached. Failover may be automatic or manual and will be discussed in more detail below. In general, failover at a high level refers to the active and standby switching roles so that the standby becomes the active and the active (typically after restarting) becomes the standby.

High-availability switch 231 also includes a plurality of communication cards (e.g., Card Slot 1 (221), Card Slot 2 (222), Card Slot 3 (223), and Card Slot N (225)) that may each have a plurality of communication ports configured to support network communication. A card slot, such as Card Slot 1 (221) may also be referred to as a "line card" and have a plurality of bi-directional communication ports (as well as a management port (not shown)). Card Slot 1 (221) is illustrated with port 1-1 (241) and port 1-2 (242) and may represent a "card" that is plugged into a slot (e.g., communication bus connection) of a backplane (e.g., communication bus) of high-availability switch 231. Other connections and connection types are also possible (e.g., cable connection). Also, in FIG. 2B, Card Slot 2 (222) is illustrated with port 2-1 (243) and port 2-2 (244); Card Slot 3 (223) is illustrated with ports 3-1 (245), 3-2 (246), and port 3-N (247); and Card Slot N (225) is illustrated with port X (248) and port Y (249).

To support communications between a controller (e.g., an active and/or a standby controller) in a switch and client devices connected to that switch, a number of communication client applications may be executing on a given switch. Client applications executing on a switch may assist in both: communication to connected clients, and configuration of hardware on the switch (e.g., ports of a line card). In some cases, client applications are referred to as "listeners," in part, because they "listen" for a communication or command and then process what they receive. Alternatively, or in addition, processes interacting with a data base may be called "publishers" and "subscribers," where subscribers receive information and publishers provide updates (e.g., writes) to information. Further, these client applications may interact with the central database to retrieve device configuration or update statistics with accumulation values or absolute values (e.g., depending on the parameter for which the statistic is being collected). For high-availability switch 231, an example client application is client 1 (230-1) which is illustrated to support communication from either the active or the standby controller to devices connected through Card Slot 1 (221).

A second example client application in FIG. 2B is client 2 (230-2) which is illustrated to support communication from either controller to both of Card Slot 2 (222) and Card Slot 3 (223). Finally, client Z (230-Z) is illustrated to support communication from both controllers to Card Slot N (225). Each of these clients is also illustrated as communicatively coupled (e.g., for publishing updates) to a database service 205 and data store DB 210 (as repeated from FIG. 2A) that are local to high-availability switch 231 in this example. Dashed lines in block diagram 220 from standby controller 2 to client applications indicate that the standby controller may be communicatively coupled to a communication card slot via a client application but may not be transmitting significant data because of its standby status. Solid lines in block diagram 220 from active controller 1 to client applications indicate an active status with likely more communication taking place. Also note that a single client may be configured to support more than one (or even part of one) communication Card Slot (line card) as illustrated with client 2 (230-2) supporting both of Card Slot 2 (222) and Card Slot 3 (223) concurrently. Upper limits on the number of card slots supported by a client may be an implementation decision based on performance characteristics or other factors of the switch and its internal design.

As explained above, multiple client applications may desire concurrent access to a remote central database (not shown in FIG. 2B) to retrieve device configuration or update operational statistics. The configuration database may be implemented locally on the switch (as illustrated) or may be remote (as shown in FIG. 2A) to the switch as discussed above with reference to FIGS. 1A-B. Devices such as the high-availability switch 231 are one of many types of devices that may utilize the central database for retrieving configuration or storing operational statistics. Devices that do not internally provide high-availability as illustrated by the high-availability switch 231 may also utilize the central database for retrieving configuration and storing operational statistics. Clustering techniques utilizing multiple devices combined together to operate as a single device may also utilize the central database to retrieve configuration and store operational statistics.

Figure 3:
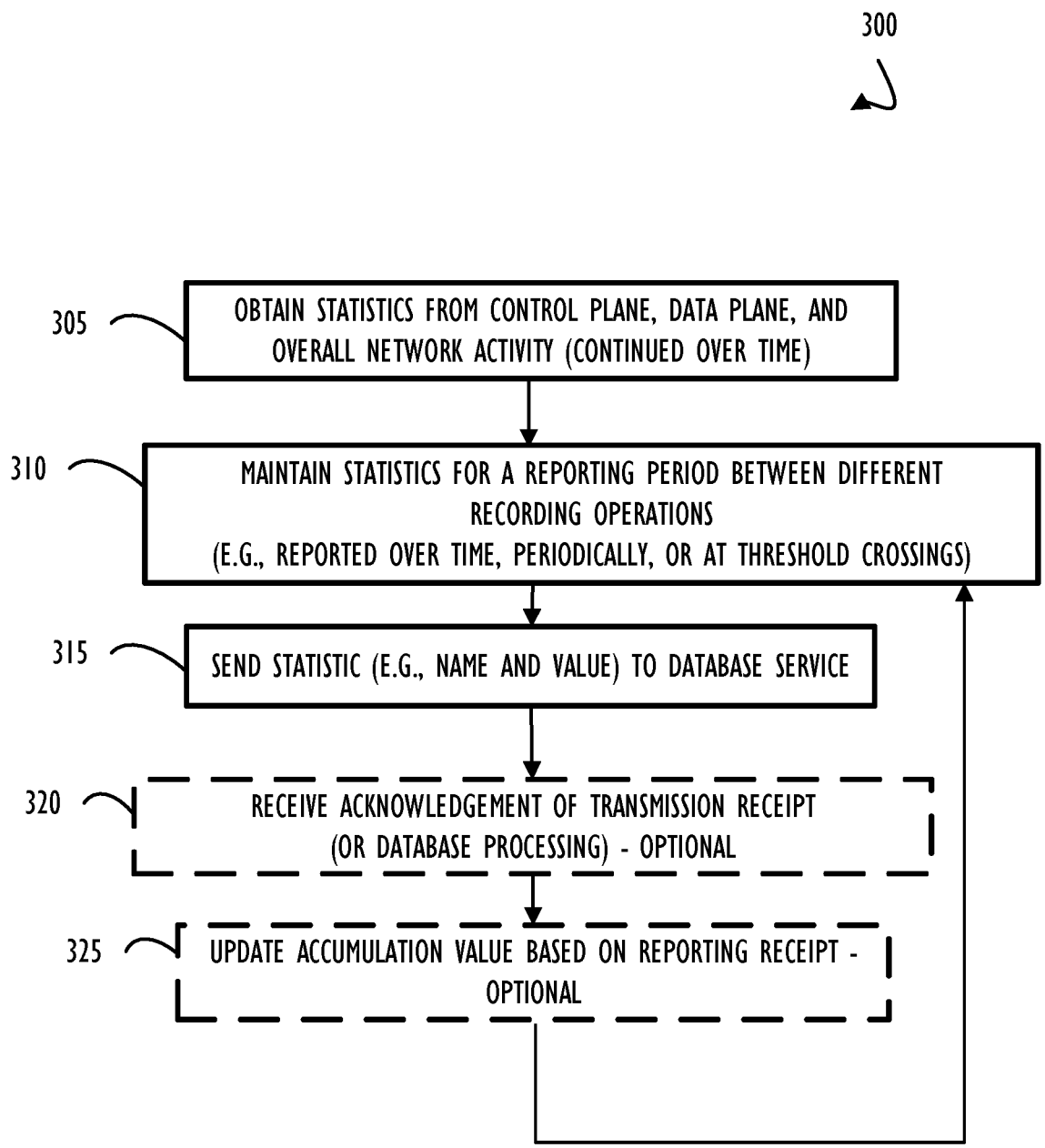
FIG. 3 illustrates a flow chart illustrating a network infrastructure device maintaining and reporting operational statistics to a central database.

Referring now to FIG. 3, illustrates a flow chart of method 300 for an example of a network infrastructure device obtaining, maintaining, and publishing operational statistics to a central database. The example illustrates one possible flow for collecting and publishing a single statistic but is not intended to limit the quantity or types of statistics that may be maintained by a network infrastructure device. It is to be understood that the flow chart in this example could be applied in parallel to collect and publish one or more statistics concurrently.

In accordance with this example, block 305 illustrates the network infrastructure device obtains statistics about activities occurring in the control plane and data plane as described in FIG. 1B. The choice of activity to observe and the statistics to collect may be determined as part of developing and building the device or as part of designing network monitoring implementations. Part of this collection may include publishing an accumulated value known internally to the device. In one implementation, a publishing of a value may include a time stamp or some other indicator to track when statistics have been reported to the central database. In another implementation, a status may be returned to a reporting device (e.g., publisher) to ensure that device that its update has been received and/or processed. The status may be returned based on a successful transmission (e.g., based on a transmission control protocol (TOP) status) or may be returned based on a database service (e.g., database service 205 from FIGS. 2A-B) having processed the update. In either case, a status may be returned to the publishing device for each successful publishing event.

Continuing to block 310, the delta (or difference) between the current accumulated statistic value and the value when the statistic was last reported may be calculated (e.g., for publishing as an accumulation value). The delta indicates the amount of change in the statistic value since the last time the statistic was recorded (e.g., successfully recorded in some implementations and merely reported in other implementations) in the central database. Some implementations may implement an accumulation reporting mechanism by resetting the accumulated value to zero after each time the accumulation value is recorded in the central database. In other implementations, an accumulation value may continue to increase until receipt of a successful acknowledgement from the database service (e.g., on a remote device or a separate local process). In some cases, a statistic may continue to accumulate and be decremented by its previously reported value upon notification of a successful update. At block 315, the network infrastructure device may send the statistic name and current accumulation value to the central database for recording. Block 320 is optional based on different implementation criteria and indicates that an acknowledgement of transmission receipt (or database processing complete) may be received at the reporting device. Block 325 is also optional and indicates, that depending on implementation details, the accumulation value may be adjusted to reflect a successful update. Finally, a return to block 310 indicates that this example method 300 may repeat in a loop.

As mentioned above, in some implementations an accumulation value may be reset to zero for every update while in others the value may continue to accumulate until a successful acknowledgement is received. In implementations requiring adjustment, the adjustment amount may simply be the amount previously reported. Specifically, a device may report a value of 200 and continue to increment its associated statistic. Upon receipt of a successful reporting, that value may have increased to 205 (e.g., 5 other increments have occurred). Thus, this implementation would decrement the current value of 205 by 200 (e.g., 205−200) and result in a value of 5 for the accumulation value. Accordingly, the accumulation value would continue to increment from 5 until the next reporting period for this device. This type of implementation may be useful for cases where updates may be unpredictable or unreliable. Using this technique for resetting accumulation values, the overall value would be "self-correcting" because the next update (after an unsuccessful update) would include the amount of the previously reported (and lost) update to the accumulation value. Other techniques are also possible.

Figure 4:
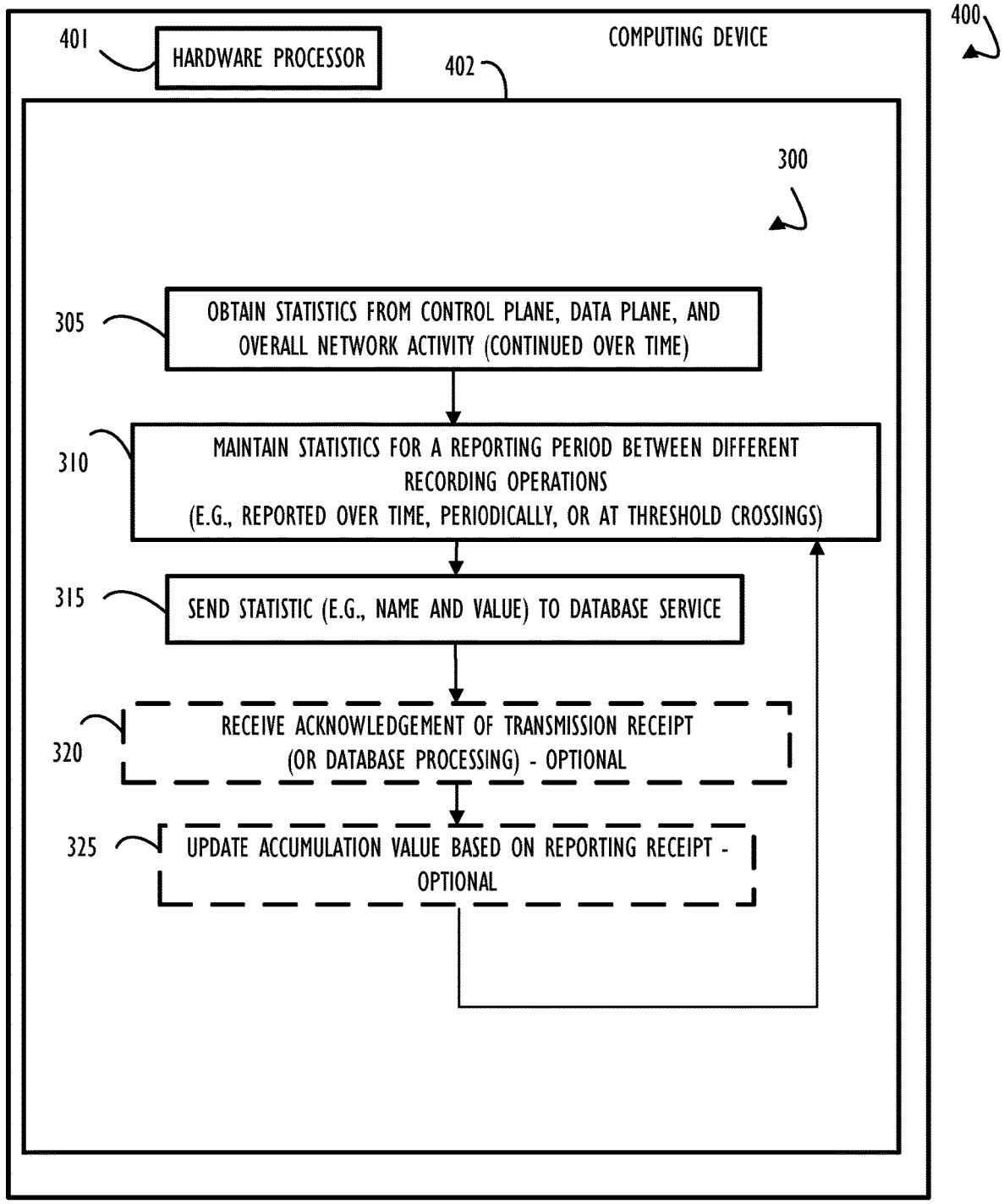
FIG. 4 illustrates an example processor and computer-readable medium used to implement a network infrastructure device recording and reporting operational statistics to a central database, according to one or more disclosed implementations.
Figure 5A:
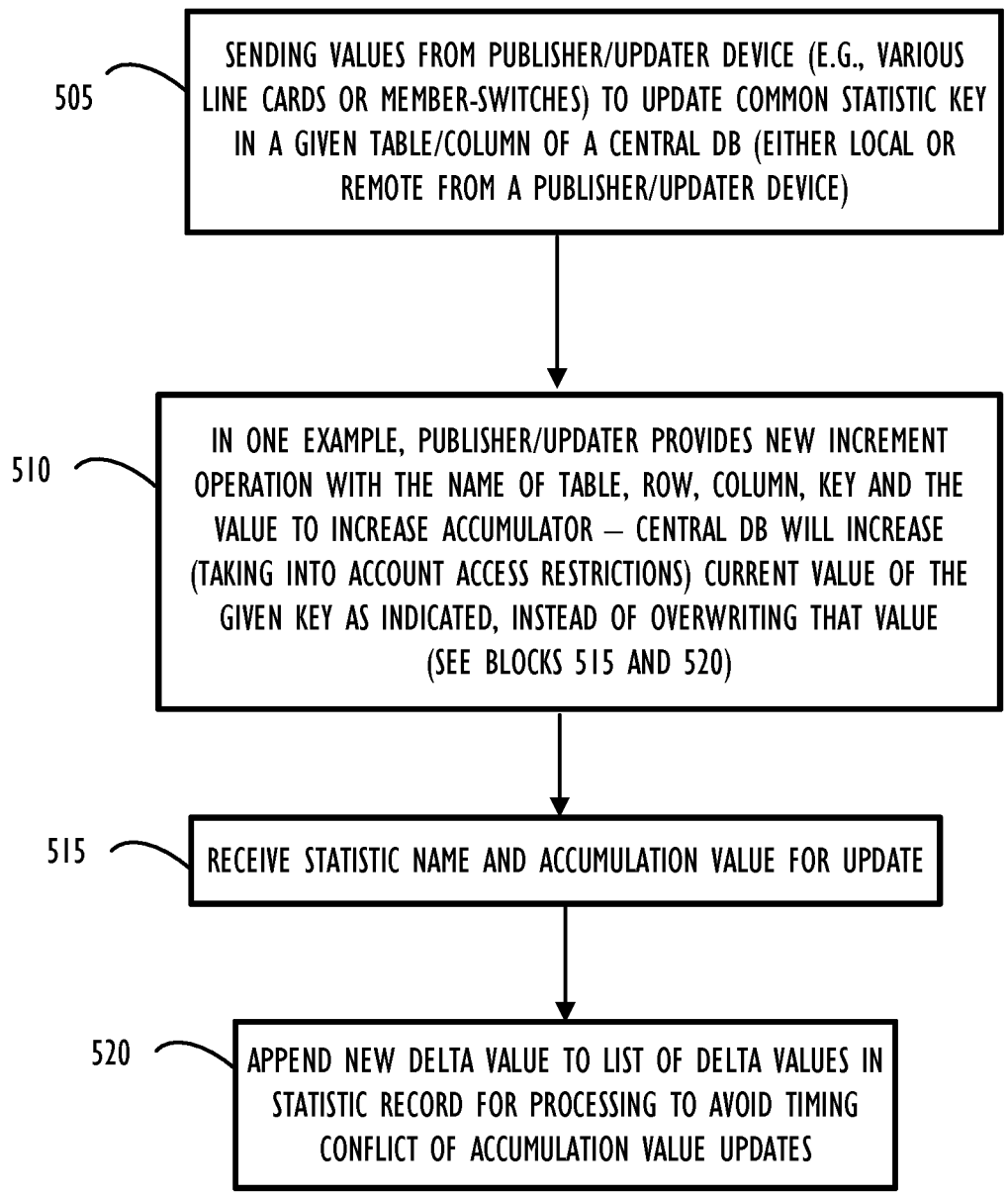
FIG. 5A illustrates a flow chart representing one possible flow for sending and receiving statistics values using a central database and recording updates to operational statistics, according to one or more disclosed implementations.

FIG. 4 is an example computing device 400, with a hardware processor 401, and accessible machine-readable instructions stored on a machine-readable medium 402 for implementing the recording of statistics in the central database, according to one or more disclosed example implementations. FIG. 4 illustrates computing device 400 configured to perform the flow of method 300 as an example. However, computing device 400 may also be configured to perform the flow of other methods, techniques, functions, or processes described in this disclosure. In this example of FIG. 4, machine-readable storage medium 402 includes instructions to cause hardware processor 401 to perform blocks 305-325 discussed above with reference to FIG. 3.

A machine-readable storage medium, such as 402 of FIG. 4, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Referring now to FIG. 5, a flow chart illustrates method 500 as an example implementation of a central database storing statistics when concurrently sent (e.g., published) by one or more network communication devices. Beginning with block 505, a network device acting as a client to the central database sends the statistic name and the accumulation value that may be appended to a list of zero or more delta values currently stored in the database for the named statistic. Again, the central database may be located local to the device (e.g., publishing device), in which case the publisher may be a client application (e.g., Client 1 230-1 from FIG. 2B) or may be a remote device such as network infrastructure device 105 from FIG. 2A. Block 510 indicates that the update publishing event may include the name of the table, row, column, key and the value to increase the accumulated value. Note that publishing clients or devices may not be aware of the current value of this statistic in the central database. In contrast, if an absolute value is sent for an update the value in the central repository may be reset to the value supplied (e.g., a value over-write). Continuing to block 515, the publishing event may be received at a database service of a central database. Block 520 indicates that a delta value may be applied to a statistic value if access controls allow immediate update of that value. In other implementations, a received delta value may be appended to a list of delta values for application upon availability (e.g., in observance with access controls) an ultimately stored in the central database as the accumulated statistic. Examples of different statistics may include, total number of packets processed by a network infrastructure device, dropped packets, flow control information, or other network operational statistics. In general, absolute values may be reflective of metrics for a single infrastructure network device and accumulation values may be more useful for network wide statistics (although this is not an absolute distinction).

Figure 5B:
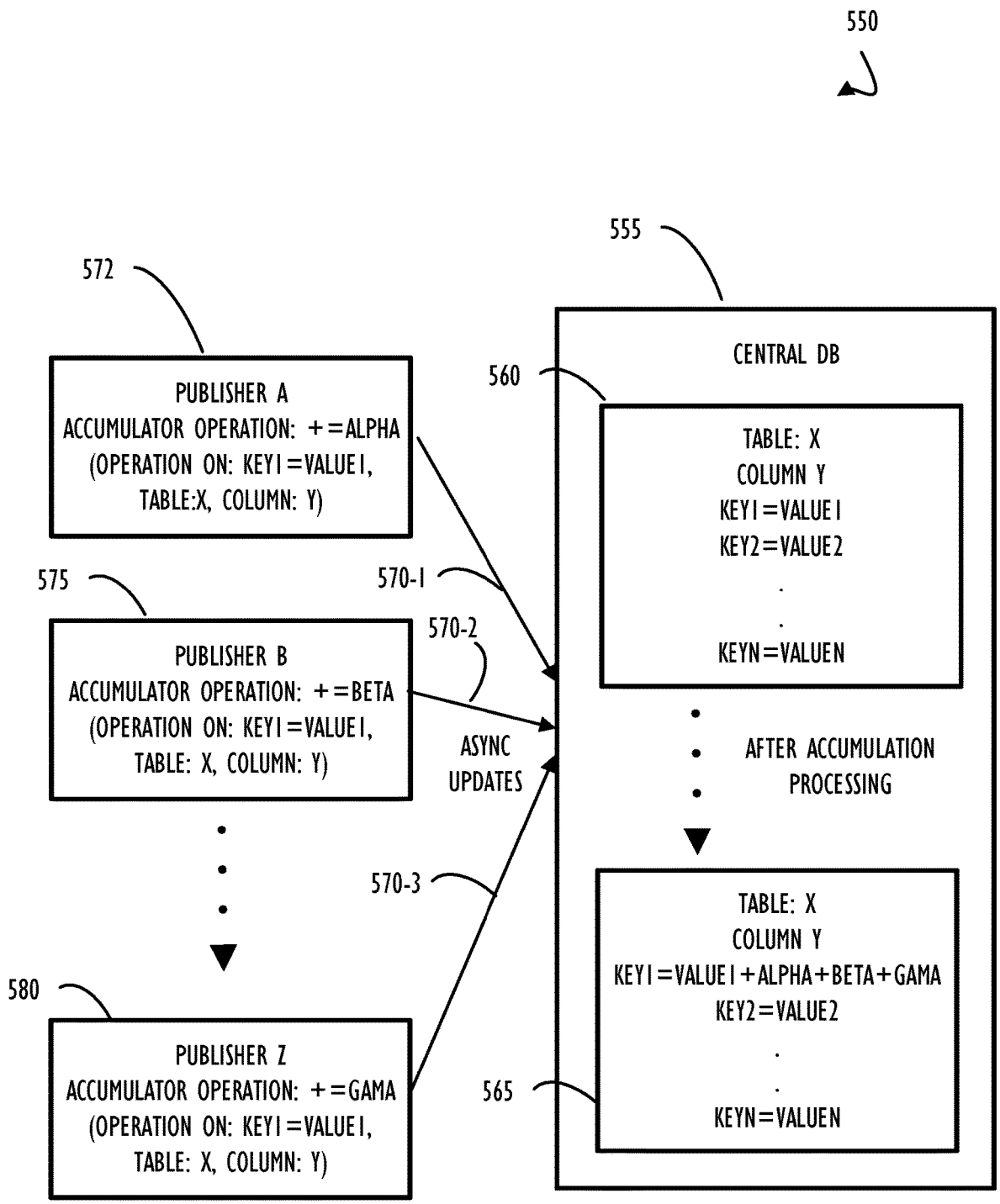
FIG. 5B illustrates an example central database receiving and applying asynchronous updates from multiple publisher/updaters, according to one or more disclosed embodiments

Referring to FIG. 5B, a block diagram illustrates multiple publishers in an example system 550 sending asynchronous updates to a central DB 555. In this example, the asynchronous updates are illustrated as arrows 570-1, 570-2, and 570-3 that are representative of publishing events from publisher A 572, publisher B 575, and publisher Z 580, respectively. Any number of publishers and asynchronous publishing events are possible. Publishing events may arrive concurrently for processing at a central DB 555. Each of the publishing events contains information for a database service (not shown) to perform accumulation processing as illustrated at block 560 (before accumulation processing) and block 565 (after accumulation processing) by the database service. In this manner, publishers may provide information to a central database without being aware of (or having the overhead of retrieving) a current value for which to increment. Thus, publishers (e.g., client applications or remote client devices) may perform more efficiently by reducing their overhead associate with providing accumulation metrics to a central database. Further, network infrastructure devices may have limited resources and efficiency of processing network statistics represents a possible improvement for each reporting device as well as the device tasked with maintaining the central database.

Figure 6:
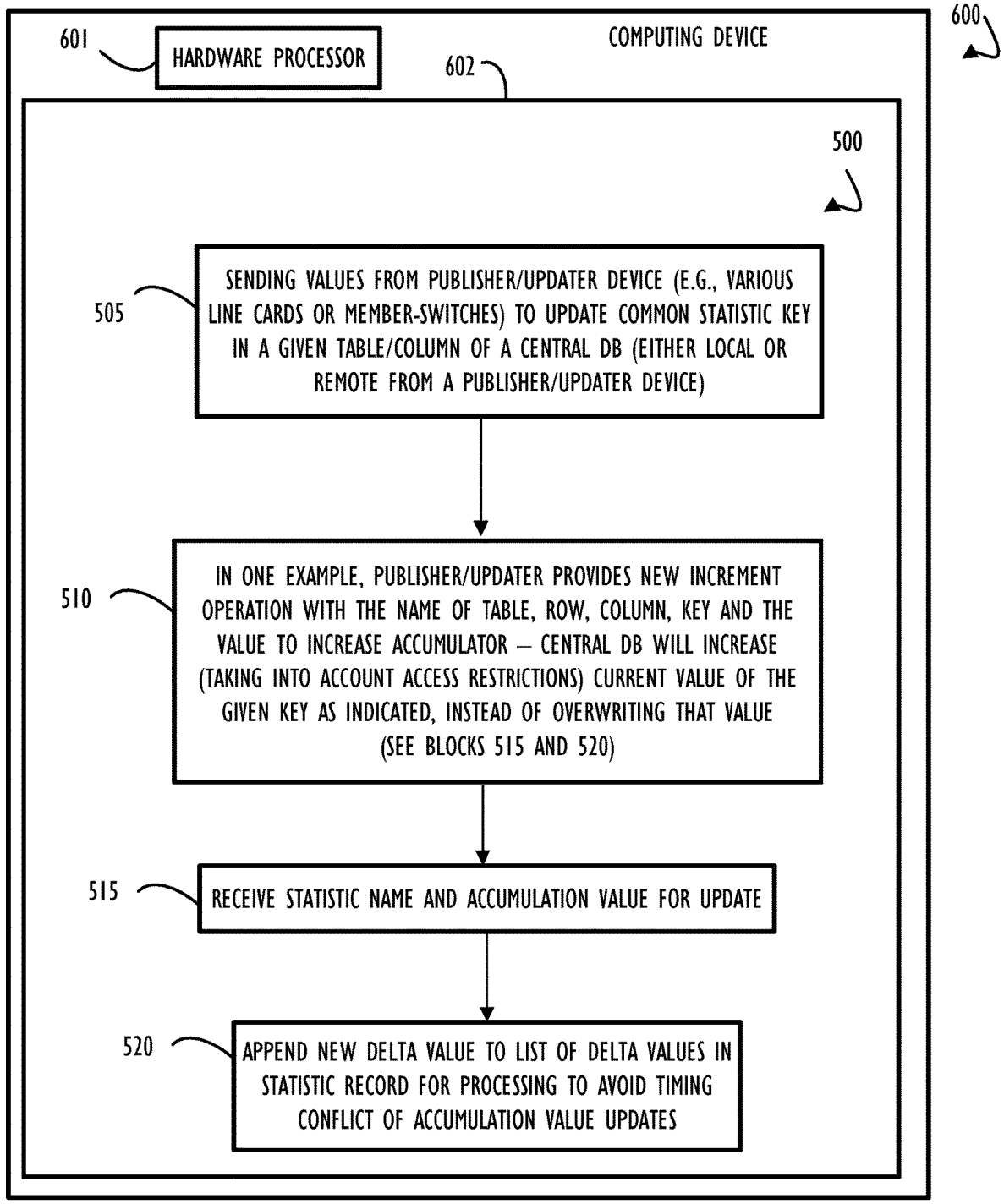
FIG. 6 illustrates an example processor and computer-readable medium to implement the central database receiving and recording asynchronous updates from multiple publisher/updaters for their respective operational statistics, according to one or more disclosed embodiments.

FIG. 6 is an example computing device 600, with a hardware processor 601, and accessible machine-readable instructions stored on a machine-readable medium 602 for implementing the statistic update in the central database, according to one or more disclosed example implementations. FIG. 6 illustrates computing device 600 configured to perform the flow of method 500 as an example. However, computing device 600 may also be configured to perform the flow of other methods, techniques, functions, or processes described in this disclosure. In this example of FIG. 5, machine-readable storage medium 602 includes instructions to cause hardware processor 601 to perform blocks 505-520 discussed above with reference to FIG. 5A.

A machine-readable storage medium, such as 602 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 7:
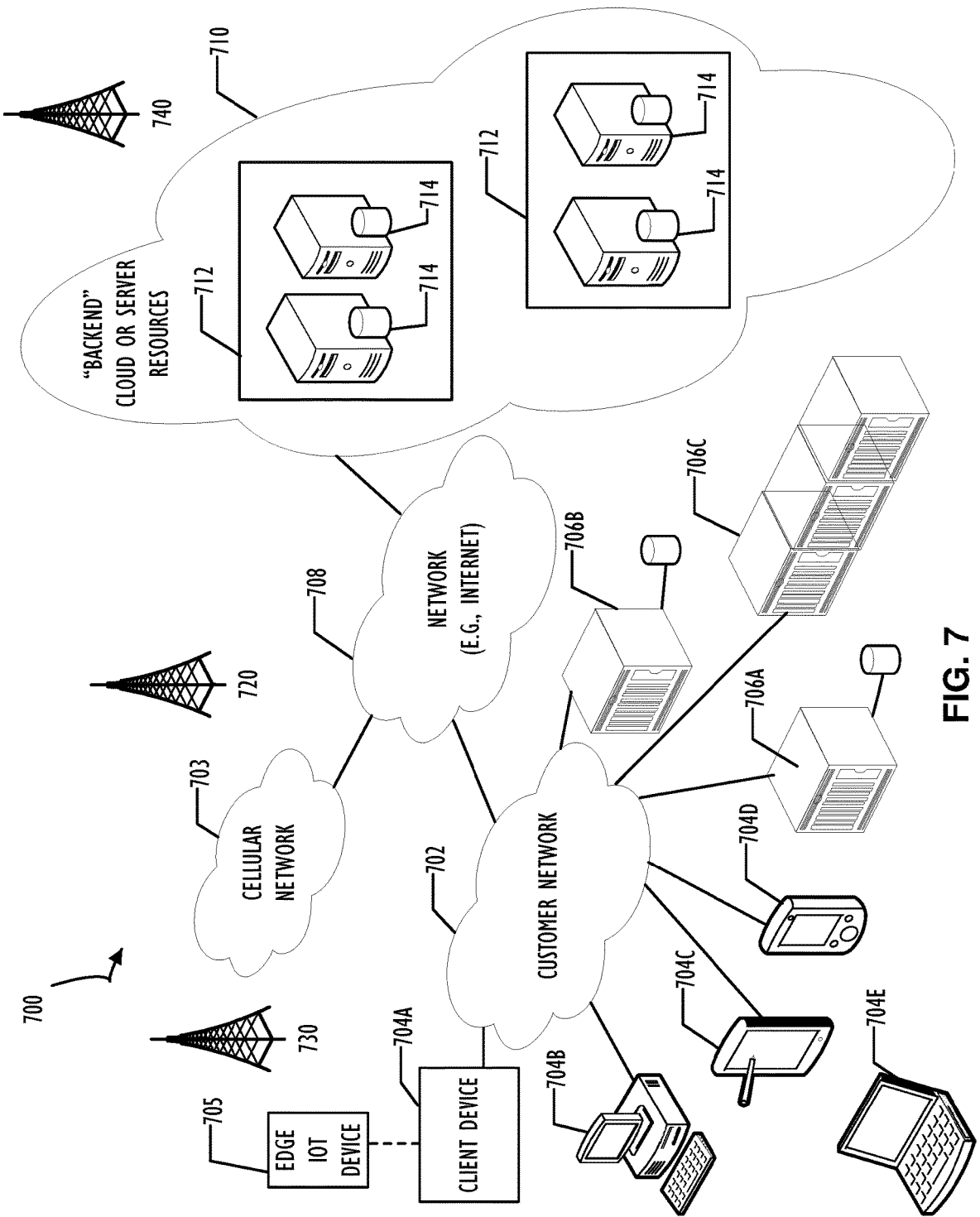
FIG. 7 presents a computer network infrastructure that may be used to implement all or part of the disclosed techniques for a central database receiving and recording updates to operational statistics, according to one or more disclosed embodiments.
Figure 8:
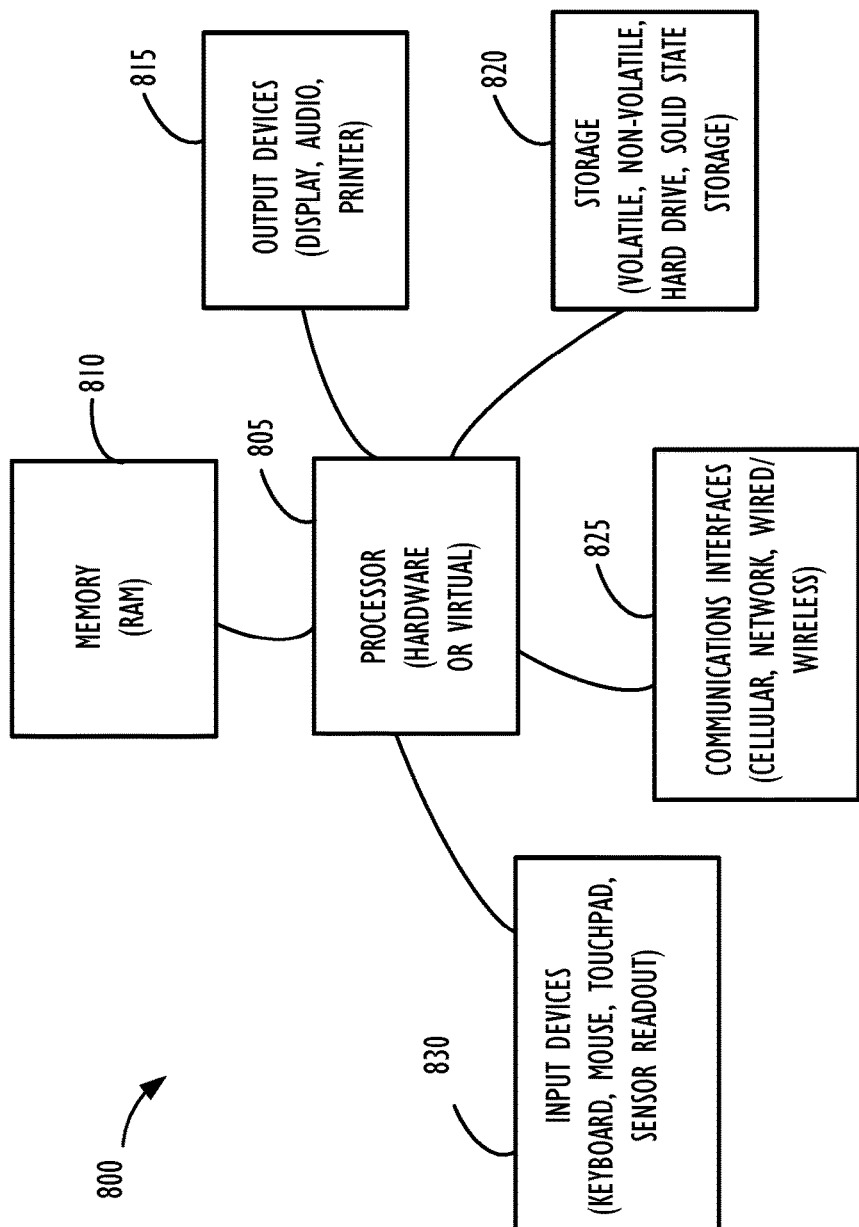
FIG. 8 illustrates a computing device that may be used to implement the functions, modules, processing platforms, execution platforms, communication devices, and other methods and processes of this disclosure.

FIG. 7 represents a computer network infrastructure 700 that may be used to implement all or part of the disclosed technique for updating operational statistics in a central database or provide information flow between a system performing the disclosed techniques and other computer networks, according to one or more disclosed examples. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include a network device supporting a central database such as that described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames representing a scalable compute resource that may benefit from the techniques of this disclosure.

FIG. 8 illustrates a computing device 800 that may be used to implement the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer device comprising:
 a network interface to connected to a network;
 a processing device communicatively coupled to the network interface; and
 a memory storing instructions, that when executed by the processing device, cause the computer device to:
  maintain a local accumulation value and associated first accumulation value for an operational parameter of the computer device for the network;
  send a first update to a statistic value as a first publishing update to a remote device configured to maintain a key value database including the statistic value, the first update including an indication to process the first update as an accumulation update to the statistic value, the first accumulation value to apply, and an indication of a key value pair to identify the statistic value to update;
  apply increments to the local accumulation value based on operational functions affecting the operational parameter to increase the local accumulation value over the first accumulation value;
  monitor for receipt of a first acknowledgement that the remote device has completed processing of the first update; and
  upon receipt of the first acknowledgement, decrement the local accumulation value by the first accumulation value.

2. The computer device of claim 1, wherein the memory further stores instructions, that when executed by the processing device, cause the computer device to:
 send a second update to the statistic value as a second publishing update to the remote device, prior to receiving the first acknowledgement, wherein the second update includes a second accumulation value representative of the local accumulation value that includes the first accumulation value plus applied increments.

3. The computer device of claim 2, wherein the memory further stores instructions, that when executed by the processing device, cause the computer device to:
 monitor for receipt of a second acknowledgement that the remote device has completed processing of the second update; and
 upon receipt of the second acknowledgement, decrement the current value of the local accumulation value by the second accumulation value.

4. The computer device of claim 2, wherein the first update to a statistics value and the second update to the statistics value are sent to the remote device without awareness of a current value of the statistics value in the database.

5. The computer system of claim 1, wherein the first update to a statistics value is sent to the remote device without awareness of a current value of the statistics value in the database.

6. A method comprising:
maintaining, by a processing device, a local accumulation value and associated first accumulation value for an operational parameter of the computer device for the network;
sending, by the processing device, a first update to a statistic value as a first publishing update to a remote device configured to maintain a key value database including the statistic value, the first update including an indication to process the first update as an accumulation update to the statistic value, the first accumulation value to apply, and an indication of a key value pair to identify the statistic value to update;
applying, by the processing device, increments to the local accumulation value based on operational functions affecting the operational parameter to increase the local accumulation value over the first accumulation value;
monitoring, by the processing device, for receipt of a first acknowledgement that the remote device has completed processing of the first update; and
upon receipt of the first acknowledgement, decrementing, by the processing device, the local accumulation value by the first accumulation value.

7. The method of claim 6, further comprising:
sending a second update to the statistic value as a second publishing update to the remote device, prior to receiving the first acknowledgement, wherein the second update includes a second accumulation value representative of the local accumulation value that includes the first accumulation value plus applied increments.

8. The method of claim 7, further comprising:
monitoring for receipt of a second acknowledgement that the remote device has completed processing of the second update; and
upon receipt of the second acknowledgement, decrementing the current value of the local accumulation value by the second accumulation value.

9. The computer device of claim 7, wherein the first update to a statistics value and the second update to the statistics value are sent to the remote device without awareness of a current value of the statistics value in the database.

10. The computer system of claim 6, wherein the first update to a statistics value is sent to the remote device without awareness of a current value of the statistics value in the database.

11. A non-transitory computer readable medium comprising computer executable instructions that, when executed by one or more processing units, cause the one or more processing units to:
maintain a local accumulation value and associated first accumulation value for an operational parameter of the computer device for the network;
send a first update to a statistic value as a first publishing update to a remote device configured to maintain a key value database including the statistic value; the first update including an indication to process the first update as an accumulation update to the statistic value, the first accumulation value to apply, and an indication of a key value pair to identify the statistic value to update;
apply increments to the local accumulation value based on operational functions affecting the operational parameter to increase the local accumulation value over the first accumulation value;
monitor for receipt of a first acknowledgement that the remote device has completed processing of the first update; and
upon receipt of the first acknowledgement, decrement the local accumulation value by the first accumulation value.

12. The non-transitory computer readable medium of claim 11, wherein the computer executable instructions further include instructions to cause the one or more processing units to
send a second update to the statistic value as a second publishing update to the remote device, prior to receiving the first acknowledgement, wherein the second update includes a second accumulation value representative of the local accumulation value that includes the first accumulation value plus applied increments.

13. The non-transitory computer readable medium of claim 12, wherein the computer executable instructions further include instructions to cause the one or more processing units to
monitor for receipt of a second acknowledgement that the remote device has completed processing of the second update; and
upon receipt of the second acknowledgement, decrement the current value of the local accumulation value by the second accumulation value.

14. The non-transitory computer readable medium of claim 12, wherein the first update to a statistics value and the second update to the statistics value are sent to the remote device without awareness of a current value of the statistics value in the database.

15. The non-transitory computer readable medium of claim 11, wherein the first update to a statistics value is sent to the remote device without awareness of a current value of the statistics value in the database.

* * * * *